United States Patent
Buse

Patent Number: 6,024,494
Date of Patent: Feb. 15, 2000

[54] POLYMER-BACKED THRUST BEARINGS

[75] Inventor: Frederic W. Buse, Allentown, Pa.

[73] Assignee: Ingersoll-Dresser Pump Company, Liberty Corner, N.J.

[21] Appl. No.: 09/023,021

[22] Filed: Feb. 12, 1998

[51] Int. Cl.[7] .................................................. F16C 17/06
[52] U.S. Cl. ........................ 384/122; 384/124; 384/308
[58] Field of Search .................................. 384/122, 123, 384/124, 307, 308

[56] References Cited

U.S. PATENT DOCUMENTS

| | | | |
|---|---|---|---|
| 3,712,691 | 1/1973 | Cope . | |
| 4,082,379 | 4/1978 | Swearingen . | |
| 4,141,605 | 2/1979 | Riordan et al. . | |
| 4,335,925 | 6/1982 | Stopp . | |
| 4,421,425 | 12/1983 | Foucher et al. | 384/123 |
| 4,596,475 | 6/1986 | Pannwitz | 384/147 |
| 4,795,220 | 1/1989 | Mori | 384/420 |
| 4,927,275 | 5/1990 | Lawson | 384/122 |
| 5,139,348 | 8/1992 | Bryden et al. | 384/275 |
| 5,145,264 | 9/1992 | Bryden et al. | 384/275 |
| 5,153,253 | 10/1992 | Moisey et al. | 524/439 |
| 5,160,246 | 11/1992 | Horiuchi | 417/365 |
| 5,181,784 | 1/1993 | Jordens et al. | 384/222 |
| 5,277,500 | 1/1994 | Keck | 384/204 |
| 5,399,025 | 3/1995 | Higuchi et al. | 384/428 |
| 5,529,399 | 6/1996 | Holze | 384/107 |
| 5,554,015 | 9/1996 | Dreiman et al. | 417/415 |

*Primary Examiner*—Lenard A. Footland
*Attorney, Agent, or Firm*—Robert F. Palermo

[57] ABSTRACT

A product lubricated thrust bearing includes an annular bearing disc made from a hard bearing material such as silicon carbide and having a plurality of radial lubrication grooves in at least one of a front and rear face thereof to define a plurality of bearing segments. A polymeric layer is bonded to the rear face of the annular bearing disc, and provision is made for preventing the bearing disc from slipping relative to the bore of the bearing carrier in which the thrust bearing is mounted. The bearing disc may be cracked along the radial lubrication grooves to allow the bearing segments to axially float. A metal disc may also be bonded to the polymeric layer opposite the bearing disc to reinforce the polymeric layer and to facilitate prevention of slippage of the bearing disc.

10 Claims, 4 Drawing Sheets

POLYMER-BACKED THRUST BEARINGS

BACKGROUND OF THE INVENTION

This invention relates generally to pump bearings and more particularly to pump thrust bearings which may be lubricated by the pumped product.

In general, a rigid thrust bearing cannot handle the applied loads in many heavy duty applications of pumps. This is, in part, due to the inability of a thrust bearing disc to form the desirable lubricant wedge at the face of the bearing, since the edges of the disc are parallel to the direction of rotation. The result is often high frictional power losses and excessive bearing and component wear in the pumps.

These difficulties may become more severe in the case of product lubrication, i.e., lubrication of the pump moving parts by the pumped product. Such products may have non-ideal viscosity and lubricity, so that they may have little tendency to form lubricant wedges; or if they form such wedges, they may provide inadequate lubricity to protect the bearing surfaces. Thus, standard thrust bearings in pumps, whether lubricated by the pumped product or by separate lubricating oil or grease, are subject to wear and degradation inherent to their design and application.

One approach to solving these problems provides a segmented thrust bearing with tiltable segments which each can form a lubricant wedge and also can distribute loads more uniformly than is the case with standard unitary bearings. These bearings, however, are composed of many parts and may be damaged by particles in contaminated lubricant which can pack into faying surfaces of the segments and their supports and interfere with their ability to change tilt in response to changing loads. Such immobilization may prevent formation of the lubricant wedge and lead to damage which shortens the life of the pump.

The foregoing illustrates limitations known to exist in currently offered thrust bearings in pumps. Thus, it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a thrust bearing including an annular bearing disc, with a plurality of radial lubrication grooves in a front face thereof, from a bearing material; a polymeric layer bonded to a rear face of the annular bearing disc; and means for preventing the bearing disc from slipping relative to a bore of a bearing carrier in which the thrust bearing is mounted.

The foregoing and other aspects will become apparent from the following detailed description of the invention when considered in conjunction with the accompanying drawings.

DETAILED DESCRIPTION

Figure 1:
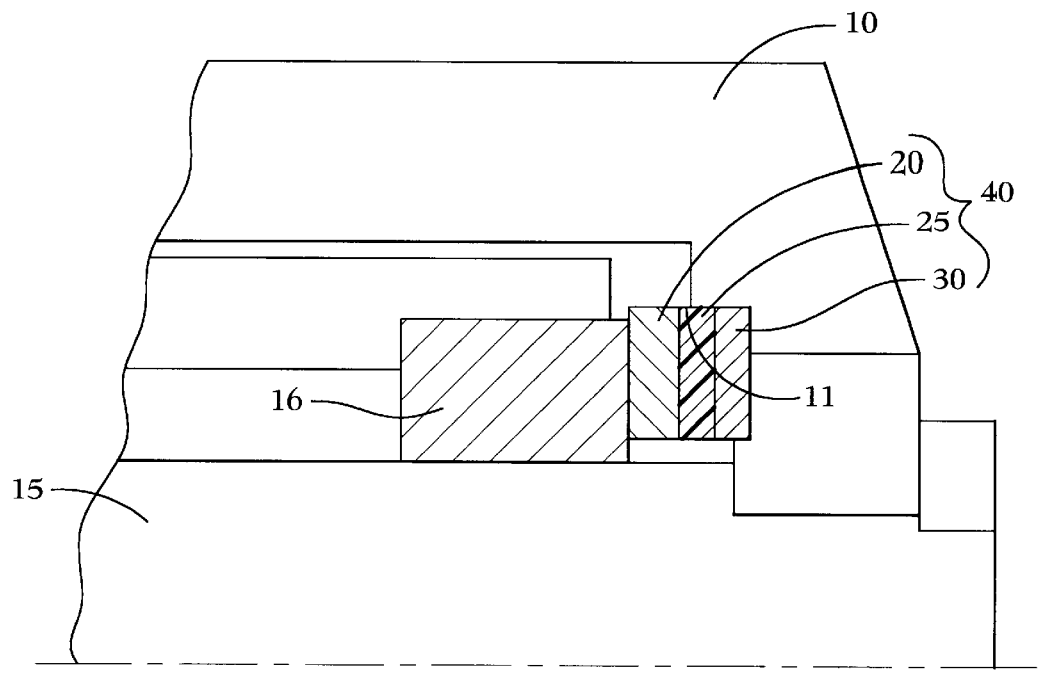
FIG. 1 is a schematic lateral partially sectional fragmentary view of a thrust bearing, according to the present invention, mounted about a shaft in a bearing carrier.

FIG. 1 shows a generalized schematic view of a bearing carrier 10 in which is mounted the thrust bearing 40 of the invention in its preferred embodiment. This is made up of thrust bearing disc 20, a bonded polymer layer 25, and a metal backing disc 30. The polymer layer may be an elastomer such as buna-n, viton, neoprene or other suitable product having durometer values appropriate for the anticipated service loads; or it may also, for high service bearing loads, be a relatively rigid plastic such as riton, PEEK, or other high strength polymer. Depending upon the composition of the polymeric layer these three layers are bonded together by vulcanization, solvent bonding, ultrasonic bonding, thermal bonding, adhesive bonding, or other permanent bonding technique.

Figure 3:
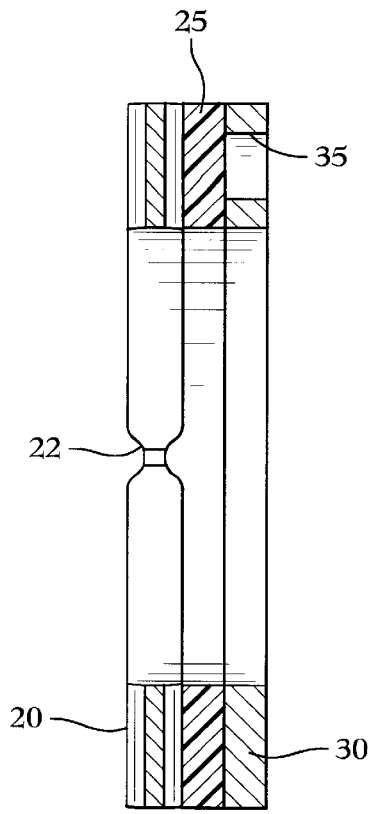
FIG. 3 is a side elevation sectional view of the thrust bearing in its preferred embodiment.
Figure 4:
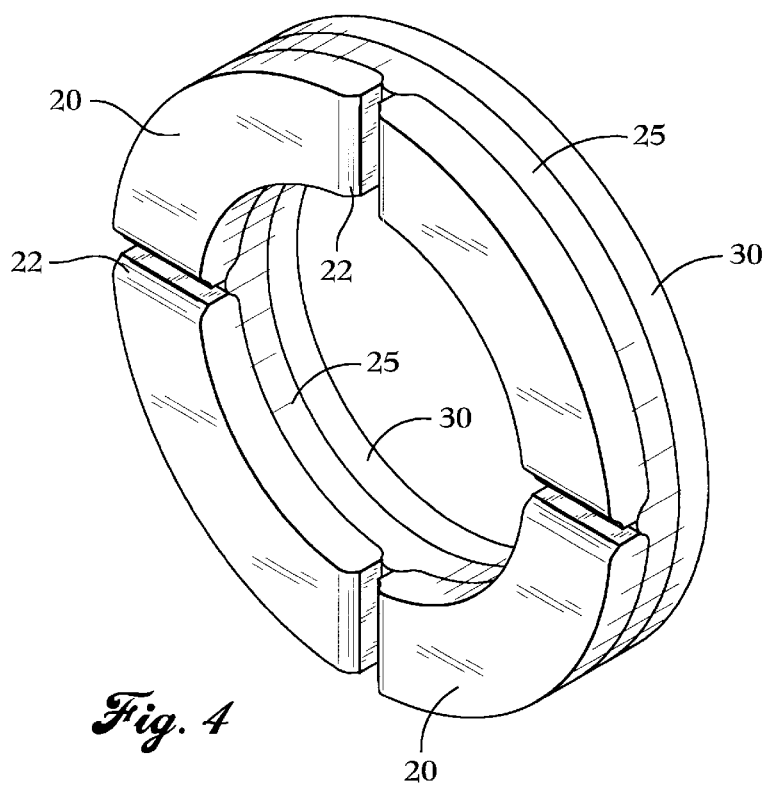
FIG. 4 is a perspective view of the bearing of FIG. 3.
Figure 5A:
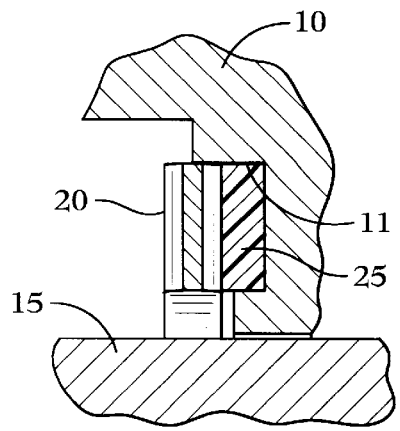
FIG. 5*a* is a side elevation sectional view of the thrust bearing, in an alternative embodiment, mounted in the bearing carrier.
Figure 5B:
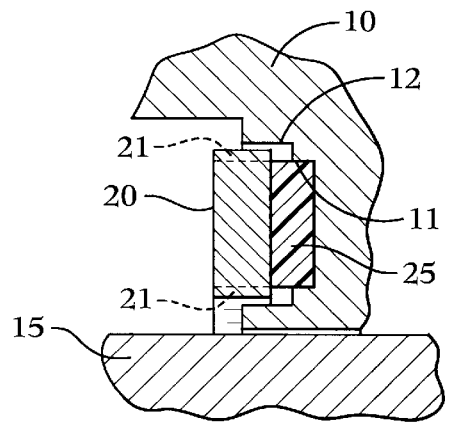
FIG. 5*b* is a side elevation sectional view of the thrust bearing of FIG. 5 showing features of an anti-rotational-slip option.
Figure 5C:
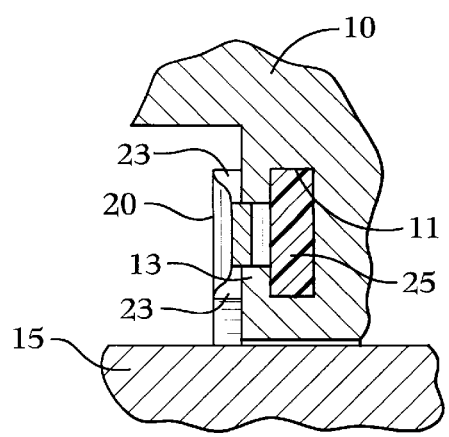
FIG. 5*c* is a side elevation sectional view of a second anti-slip option.
Figure 5D:
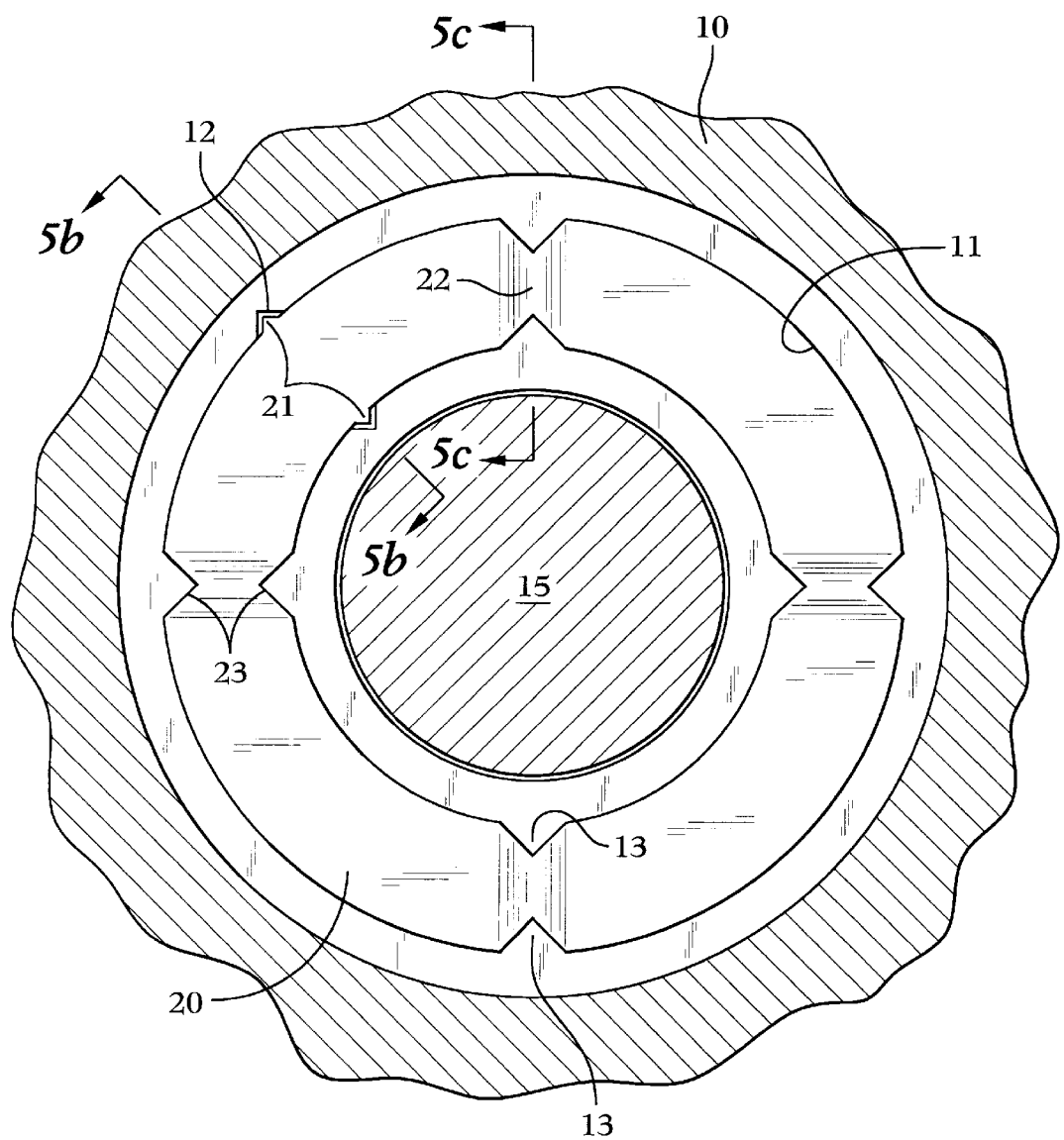
FIG. 5*d* is a frontal elevation view of the bearing of FIG. 5*b* to illustrate further details of the anti-slip features.

A shaft 15 has a collar 16 which rides against the face of the annular thrust bearing disc 20. In this case, the bearing 40 is prevented from rotational slipping relative to the inner bearing carrier 10 by virtue of the fit of the bearing disc (FIG. 5*a*) and/or of the backing disc 30 in the socket 11 of the inner carrier. It could also be held by pins and holes in the bearing and/or the backing disc and the carrier or by other interengaging projections and recesses formed on the bearing and the carrier. (These interengaging features are best illustrated in FIGS. 5*b*, 5*c*, and 5*d*) Note that the backing disc 30 is fixed in the bearing carrier 10 but the bearing disc 20 is held by the flexible polymeric layer 25 to the backing disc. The backing disc 30 of FIG. 3 shows a hole 35 for engaging a pin (not shown) fixed in a hole (also not shown) in the bearing carrier 10.

Figure 2A:
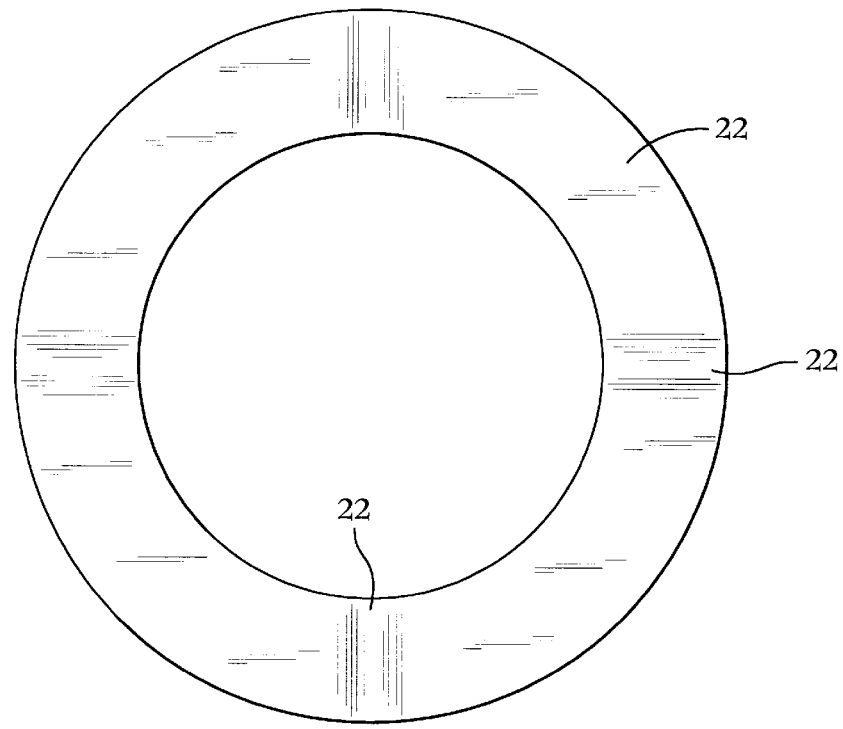
FIGS. 2*a* and 2*b* are a front elevation and a side elevation sectional view, respectively, of the annular bearing disc of the invention.
Figure 2B:
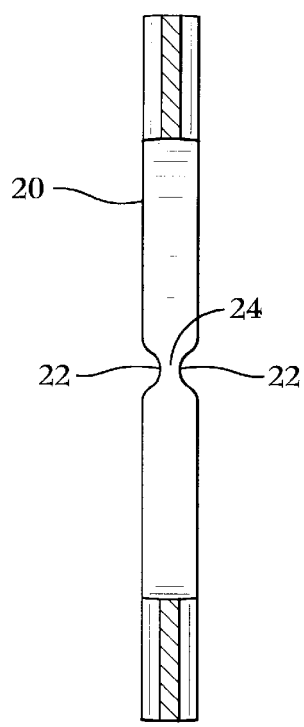

FIGS. 2*a*, 2*b*, 3, and 4 show the lubrication grooves 22 which are in at least the front face of the bearing disc 20. These feed lubricant to the leading edge of the rubbing face of each segment of the bearing 20 to promote formation of the lubricant wedge. They also are used to permit breaking of the bearing disc 20 into a plurality of bearing segments—as many segments as there are lubricant grooves 22. There could be 3, 4, 5, or more segments, depending on the size of the bearing and the nature of the lubricant. The bearing segments are flexibly retained by, the polymeric layer 25, on the backing disc 30, so they are free to tilt slightly but are otherwise firmly held. The tilt capability permits formation of the lubricant wedge by the lubricant in grooves 22. Depending on the size and thickness of the bearing disc 20, the grooves 22 may be required on both faces, as shown in FIG. 2*b*, which leaves a thin web 24. This facilitates breaking the disc into the desired number of segments after bonding the bearing disc 20, the polymeric layer 25, and the backing plate 30 together to form the thrust bearing 40. Of course, even with a thick bearing disc 20, the grooves 22 could be made only on the front face, but they would need to be much deeper to provide the same weakening effect as do the two-sided grooves.

FIGS. 5*a*, 5*b*, 5*c*, and 5*d* show an alternative embodiment of the thrust bearing which comprises bearing segments of the bearing disc 20 and the polymeric layer 25, together with two exemplary interengagement features for prevention of rotation, or slip, of the bearing segments in the socket of the bearing carrier. FIG. 5b shows a side elevation sectional view along line b—b of FIG. 5d. It shows the projections 21, on one of the bearing segments of the bearing disc 20, engaged with conforming recesses 12 in the wall of the socket 11 of the bearing carrier 10. Only two projections 21 and recesses 12 are shown, but it should be noted that any number of these features may be incorporated, and, depending upon the size and operating conditions of the bearing, they may only be needed on the outer or inner periphery of the bearing disc 20. Alternatively, the projections may be provided in the socket 11 to engage with recesses in the bearing segments. This option is seen in FIG. 5c which is a view, along line c—c of FIG. 5d, which shows the anti-slip recesses 23 at both ends of the lubrication grooves 24 of the bearing disc 20. They are engaged by the projections 13 of the walls of the socket 11 in the bearing carrier 10. FIG. 5d is an illustration of the two anti-slip provisions described. It is not intended to limit the configuration of, the number of, or the placement of such provisions on the bearing disc 20 and/or the socket 11. This bearing is secured in the bearing carrier 10 by engagement between the outer circumference of the bearing disc 20 and the surrounding socket 11. The segments of the bearing disc 20 are held by the flexible elastomer 25 and are free to tilt to accommodate the lubricant wedge. This embodiment is not as durable as the embodiment having the backing disc 30.

The bearing disc 20 may be formed from silicon carbide or other carbides, graphite, ceramics, hardened metals, or composites. The polymeric layer 25 may be formed from viton, buna-n, riton, PEEK, or other polymers having the appropriate resilience, strength, and heat and chemical resistance for fabrication and the anticipated service environment. The ultimate selection depends upon the service requirements of the pump in which the bearing is to be applied.

Having described the invention, I claim:

1. In a pump lubricated by pumped product, a thrust bearing for use in a bore in a bearing carrier, comprising:

an annular bearing disc comprising a plurality of bearing segments made from a bearing material, said segments separated by a plurality of radial lubrication grooves in at least one of a front and rear face of said disc and joined together by a polymeric layer bonded to the rear faces of said segments; and at least one recess or one projection on said annular bearing disc for engagement with at least one projection or one recess on said inner bearing carrier for preventing the bearing disc from slipping relative to the bore of said inner bearing carrier.

2. A thrust bearing for use in a bore in a bearing carrier, comprising:

an annular bearing disc comprising a plurality of bearing segments made from a bearing material, said segments being defined by a plurality of radial lubrication grooves in at least one of a front and rear face of said disc and joined together by a polymeric layer bonded to the rear faces of said bearing segments; and means for preventing said bearing disc from slipping relative to the bore of said bearing carrier.

3. The thrust bearing of claim 2, wherein the annular bearing disc is formed from silicon carbide.

4. The thrust bearing of claim 2, wherein the polymeric layer is formed from viton.

5. The thrust bearing of claim 2, wherein the means for preventing the bearing disc from slipping relative to the bore of the bearing carrier comprises a projection formed on at least one of the outer periphery and inner periphery of at least one of said bearing segments of said bearing disc for engaging with at least one corresponding projection in the socket of said bearing carrier.

6. The thrust bearing of claim 2, wherein the means for preventing the bearing disc from slipping relative to the bore comprises a recess formed in at least one of the outer periphery and inner periphery of said bearing disc at an end of at least one of the radial lubrication grooves for engaging with at least one corresponding projection in the socket of said bearing carrier.

7. The thrust bearing of claim 2, wherein the means for preventing the bearing disc from slipping relative to the bore comprises one or more holes formed in one or more of the bearing segments for each receiving a pin fixed in a matching hole in said inner carrier.

8. The thrust bearing of claim 2, further comprising:

a metal disc bonded to said polymeric layer opposite the rear face of said annular bearing disc.

9. The thrust bearing of claim 8, wherein the means for preventing the bearing disc from slipping relative to the bore comprises one or more holes formed in the metal disc for each receiving a pin fixed in a matching hole in said inner carrier.

10. The thrust bearing of claim 8, wherein the means for preventing the bearing disc from slipping relative to the bore comprises one or more recesses or projections formed on the metal disc for engaging corresponding projections or recesses in said inner carrier.

* * * * *